United States Patent [19]

Marshall

[11] Patent Number: 5,036,592
[45] Date of Patent: Aug. 6, 1991

[54] DETERMINING AND MARKING APPARATUS AND METHOD FOR USE IN OPTOMETRY AND OPHTHALMOLOGY

[76] Inventor: Forrest A. Marshall, P.O. Box 649, Dublin, Ga. 31021

[21] Appl. No.: 467,269

[22] Filed: Jan. 19, 1990

[51] Int. Cl.$^5$ .......................... G01B 1/00; B43L 13/00
[52] U.S. Cl. .......................................... 33/028; 33/507
[58] Field of Search .......................... 33/28, 200, 507; 351/204

[56] References Cited

U.S. PATENT DOCUMENTS

| | | |
|---|---|---|
| 1,750,731 | 3/1930 | Smith . |
| 1,751,425 | 3/1930 | Smith . |
| 2,536,367 | 1/1951 | Holmes . |
| 2,884,832 | 5/1959 | Engelmann . |
| 4,115,924 | 9/1978 | Kleinkopf . |
| 4,206,549 | 6/1980 | Gould . |
| 4,216,588 | 8/1980 | Richards et al. ...................... 33/18.1 |
| 4,252,419 | 2/1981 | Padula II, et al. . |
| 4,575,946 | 3/1986 | Bommarito . |
| 4,653,192 | 3/1987 | Conrad et al. . |

OTHER PUBLICATIONS

Page 29 of the U.S. Optical Spring '90 catalog.
pp. 79-80 of the Western Optical Ophthalmic Instrument Catalog 1989/1990.
Chapter 28 of Borish, Clinical Refraction (3d ed. 1970), "Bifocals, Multifocals, and Progressive Addition Lenses".
Borish, Hitzeman, and Brookman, "Double Masked Study of Progressive Addition Lenses", *Journal of the American Optometric Association* 933-43 (vol. 10, No. 51, 1980).
Rosner, "How to Troubleshoot Progressive Lens Problems", *Review of Optometry* 45-46 (Feb. 1990).
A "Multi-Purpose Measuring Device", of the Varilux Corporation.
Two Photographs of a Pupilometer and Pupillary Distance Ruler.
An Advertisement Entitled, "Trust Their Promises or Believe Your Own Eyes", for Sola Optical USA, Inc. (©1988).
An Advertisement Entitled, "You Dream. We Deliver.", for American Optical.
Three Photographs of the Grolman Fitting System.

*Primary Examiner*—Harry N. Haroian
*Attorney, Agent, or Firm*—Kilpatrick & Cody

[57] ABSTRACT

An apparatus and method for subjectively determining the proper positioning of progressive power or other corrective lenses are disclosed. The apparatus includes a target such as a small fiber optic or other light source and one or more marking rods which may be activated by the patient. While wearing prefitted frames and fixating on a remote target, the patient places the light source against or immediately adjacent the exterior surface of the simulated or other lens within either of the frames and positions the light so that it is centered in his or her line or sight. Once the light is centered the patient activates the marking rod which contacts, and marks, the exterior surface of the lens. Because the light source and marking rod or rods are designed to obstruct very little of the patient's vision, his or her peripheral vision remains intact during the process, thereby allowing binocular fusion to occur and avoiding introduction of phoria errors into the positioning process.

18 Claims, 3 Drawing Sheets

DETERMINING AND MARKING APPARATUS AND METHOD FOR USE IN OPTOMETRY AND OPHTHALMOLOGY

This invention relates to apparatus and techniques for subjectively determining relationships between patients' pupils and locations on corresponding multi-focal spectacle lenses.

BACKGROUND OF THE INVENTION

Multi-focal lenses, frequently used for remedying presbyopia, contain two or more regions of differing corrective power. An early attempt at constructing multi-focal lenses involved joining pieces of two separate lenses, one positioned above the other, within the eyewires of each of a patient's left and right spectacle frames. Called "Franklin Bifocals," these lenses included distinct horizontal lines demarcating the boundary between the joined lens pieces in each frame. The sharp dividing lines were cosmetically unattractive, however, and the lenses themselves were mechanically weak.

More modern bifocal designs provide far- and near-viewing correction for each eye using a single lens fitted into the eyewire of the corresponding spectacle frame. Typically designed to correct the distance vision of the patient, the single lens includes a cavity or countersink ground into either its front or rear surface. A separate segment button is fused to the countersink to provide the appropriate additive power for near vision correction. Alternatively, the distance prescription may be ground on one surface of a single lens and the power of the addition ground on the other. Each of these designs supplies lenses mechanically stronger than the Franklin bifocal; the designs do not, however, eliminate the unattractive boundary visible between the two prescriptive surfaces. Use of these conventional bifocals also causes patients to experience blurriness in zones corresponding to the demarcation lines as the patients move their eyes vertically.

Progressive power lenses, also known as "invisible" bi- or tri-focal lenses, eliminate the discontinuities visible in other multi-focal designs and resulting vertical blurriness by continuously varying the corrective power throughout particular regions of single lenses. Such progressive power lenses effectively disguise their multi-focal nature by blending adjacent prescriptive curves through grinding and polishing techniques. Blending adjacent curves introduces other optical distortions, however, creating, for some patients, unwanted astigmatism or vertical prism imbalance. Progressive power lenses also typically contain narrow optical corridors connecting the distance and near viewing areas, reducing the peripheral clarity, and resulting comfort level, of many wearers.

An important consideration in accommodating invisible bifocal lenses to the eyes of patients involves orienting the visual axes of the eyes at the optical thresholds where the progressive powers begin. In other words, as the left and right eyes move together vertically in the progressive pathways, they should encounter parts of the invisible bifocal lenses of the same progressive power. This result depends in part on the choice of spectacle frames and whether the respective dimensions of the frames allow accurate centering of the lenses with respect to patients' pupils. Proper alignment also depends on the technique used to determine the centers of the patients' pupils.

A variety of devices exist for assisting a practitioner in objectively determining the centers of a patient's pupils relative to predetermined locations while the patient's head is in its primary position. One such device, the "Multi-Purpose Measuring Device" provided by the Varilux Corporation, is a transparent, lined overlay having a pointed bottom which is designed to adhere temporarily to a patient's spectacle frames. While facing the sitting or standing patient who is wearing spectacles, the practitioner places the pointed end of the measuring device in the deepest point of one of the left or right frames. The practitioner subsequently attempts to align his or her line of sight with the eye of the patient corresponding to the frame containing the measuring device and marks the pupil center on the measuring device using a washable felt tip pen. The practitioner can then read the vertical distance from that pupil center to the frame bottom from the markings on the measuring device. The vertical distance from the center of the patient's other pupil relative to the frame bottom may be determined similarly.

To measure the horizontal distance from the patient's pupil center to a particular location, typically the bridge of the patient's nose, the practitioner orients a measuring device resembling a conventional ruler approximately parallel to the floor and places it slightly above the patient's nose bridge. The practitioner then sights along an imaginary vertical line intersecting the center of one pupil and, using the measuring ruler, determines the horizontal distance from the pupil center to the bridge of the nose. Similarly, the horizontal distance between the pupil center of the other eye and the bridge of the nose may be determined by sighting along an imaginary vertical line intersecting the other pupil.

These measuring techniques lack the precision necessary to position invisible bifocals suitably for many patients. At least a portion of the patient's pupil is obstructed by the lined overlay, decreasing both the patient's ability to focus appropriately and the practitioner's ability to locate the pupil center. Parallax presents another problem, as the practitioner often cannot precisely align his or her line of sight with that of the patient. Because no concrete structure exists against which the practitioner can verify that the visual axis measurements are accurate, errors made in determining the pupil centers cannot be corrected before the prescriptive spectacle lenses are made.

U.S. Pat. No. 4,206,549 to Gould, which patent is incorporated herein in its entirety by this reference, discloses another objective device for determining the centers of a patient's pupils. The Gould device overcomes some of the disadvantages of other techniques by using a transparent plate with a small target mark that may be magnetically clamped to a lens. Initially, a patient is fitted with a pair of spectacle frames, many of which frames are provided to the practitioner with plane simulated lenses in place. If such spectacles lack these "demonstrator" lenses, plane simulated lenses may be formed by cutting a sheet of plastic or similar material and secured in the spectacle frames. The transparent plate subsequently is attached to either the left or right frame (and later to the other frame if necessary) using sets of magnets located on the opposite surfaces of the lens, and the practitioner aligns the target mark with the center of the patient's pupil by sliding the transparent plate across the lens until he or she believes that the target mark is aligned with the patient's visual axis. Although not disclosed in Gould, presumably the frames are removed from the patient's head and a mark is made on the interior surface of the lens corresponding to the location of the target mark.

Once the lens mark is made the plate presumably is removed and a small spot of fluorescent paint is placed on the contra-ocular surface of the simulated lens coincident with the recording mark. The practitioner then aligns himself or herself with the patient and sights the luminous spot to determine if the recording marks are aligned with the center of the pupil. Alternatively, light may be projected on the luminous spot from a position at an angle to the visual axis of the simulated lens. The patient while fixating at infinity views the colored spot and can inform the practitioner whether the mark is properly aligned with the visual axis.

Because the practitioner makes the initial determination of the pupil center in each case, parallax and other misalignment problems—both in sighting along the patient's visual axis and in marking the location of the target mark on the lens surface—remain when using the Gould device. Any bias present in the practitioner's sighting tendencies also affects the resulting measurement, as does any similar predisposition associated with the practitioner's lens marking capabilities. The friction caused by sliding the magnetically clamped plate across the lens surface may cause slight movement of the spectacle frames from their normal position, further decreasing the accuracy of the determination of the relationship between the pupil center and corresponding lens. For patients having long eyelashes or whose spectacle lenses normally are worn close to their eyes, the magnets on the interior surface of the lenses also may contact their eyelashes and cause the patients difficulty in focusing during the examination. Finally, although the patient may confirm the work of the practitioner by noting whether the fluorescent spots align, misalignment does not necessarily provide the practitioner with additional information to increase the probability of proper alignment during the next iteration of the examination.

The Gould patent also discloses a subjective embodiment in which an opaque plate having a pinhole may be magnetically clamped to the lens. The patient may then sight at an appropriately positioned remote light source or target while adjusting the plate until the light source or target is seen through the pinhole. Each pinhole location subsequently is marked, presumably on the interior surface of the lens, by the practitioner after removing the frames from the patient's head. While this embodiment minimizes the effects of parallax when aligning the pinhole and pupil center, it does not diminish the parallax problems associated with marking the location of the pinhole on the lens, nor does it reduce the other obstacles related to use of the objective embodiment of the Gould device. Moreover, because the opaque plate of the subjective embodiment blocks the patient's peripheral vision, binocular fusion cannot occur and phoria may be introduced.

SUMMARY OF THE INVENTION

The present invention provides a simple, easy to use device and associated method for subjectively determining the proper positioning of progressive power or other lenses. The device, which is designed principally to be held by the patient, includes a small light source and one or more patient-activated marking rods. The patient, while wearing the pre-fitted frames and fixating on a remote target (which itself may be illuminated for patients with extremely poor vision), places the light source against or immediately adjacent the exterior surface of the demonstrator lens within either of the frames and positions the light so that it is centered in his or her line of sight. Once the light is centered the patient activates the marking rods, which contact the exterior surface of the lens at two (or more) points equidistant from the center of the light source. By bisecting a real or imaginary line drawn to connect the two points on the simulated lens, the practitioner or lens maker (or even the patient) may precisely determine the location where the power change of the progressive power or other lens should begin.

The present invention avoids the problems associated with objective devices by allowing the patient to participate both in aligning the device and marking the lens. Furthermore, because the light source and marking rods are designed to obstruct very little of the patient's vision, his or her peripheral vision remains intact and allows binocular fusion to occur. The absence of magnets or any other foreign objects on the interior lens surface allows the patient to wear the spectacles in their normal position without regard to whether the objects will contact his or her eyelashes. Similarly, by not using magnetic or other clamping means within the field of view, the various embodiments of the present invention may be repositioned by the patient without causing movement of the spectacle frames themselves.

Because the invention relieves the practitioner of the tedium of measuring and marking the patient's visual axes, the practitioner's response to use of progressive power lenses should be more favorable. As noted in Borish, Hitzeman, and Brookman, *Double Masked Study of Progressive Addition Lenses*, in Journal of the American Optometric Association, vol. 51, no. 10, pp. 933-43 (October 1980), the potential acceptance of the progressive power lenses by the patient is colored by the enthusiasm of the practitioner suggesting their use. In addition, because the patient participates in the examination and determination of the lens location, he or she has greater incentive to adapt to the progressive power lenses. The combination of increased enthusiasm of both patients and practitioners should result in a greater acceptance of progressive power lenses generally.

It is therefore an object of the present invention to provide means for subjectively determining the appropriate position of a progressive power or other lens within a spectacle frame.

It is an additional object of the present invention to provide means for subjectively aligning a target with a patient's visual axis and marking a lens accordingly.

It is another object of the present invention to provide means for subjectively determining the appropriate positioning of a progressive power or other lens without introducing phoria caused by blocking the patient's peripheral vision.

It is yet another object of the present invention to provide simple, easy to use means for precisely determining the center of a patient's pupil relative to a lens within spectacle frames.

It is a further object of the present invention to provide means for increasing the acceptance level of progressive power lenses by allowing the patient to participate in determining the location of the lenses relative to the center of the pupils and reducing the effort required of the practitioner.

Other objects, features, and advantages of the present invention will become apparent with reference to the remainder of the written portion and the drawings of this application.

DETAILED DESCRIPTION OF THE DRAWINGS

Figure 1:
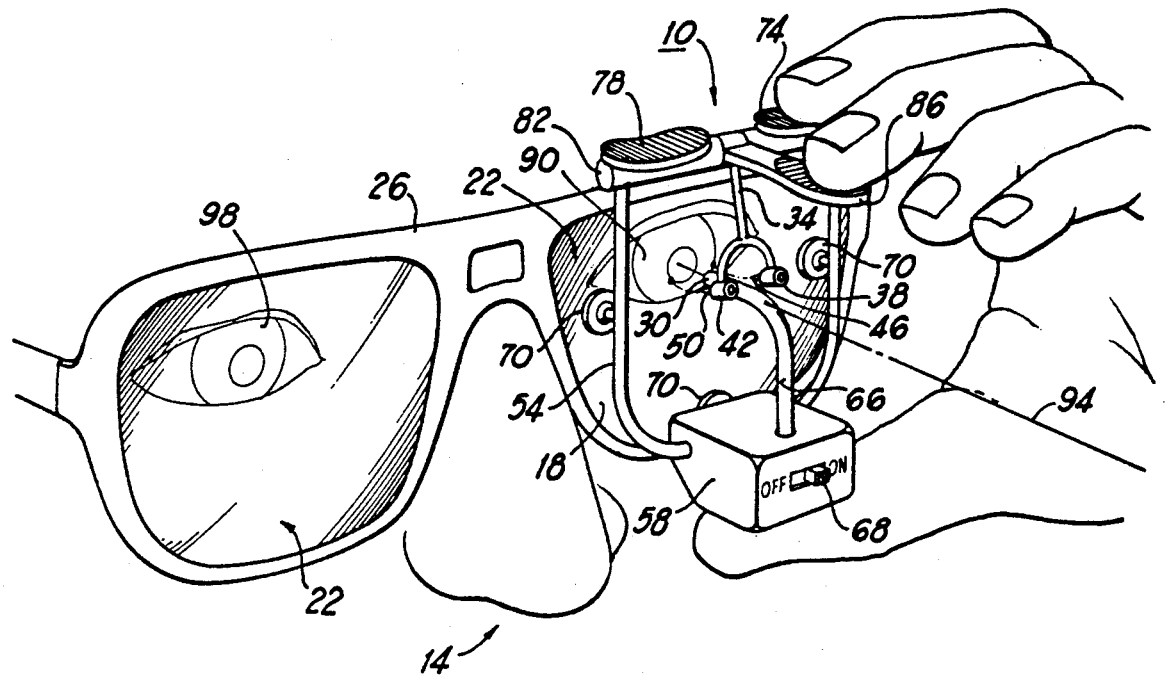
FIG. 1 is a perspective view of an embodiment of the apparatus of the present invention shown positioned by a patient adjacent the exterior surface of a spectacle lens.
Figure 2:
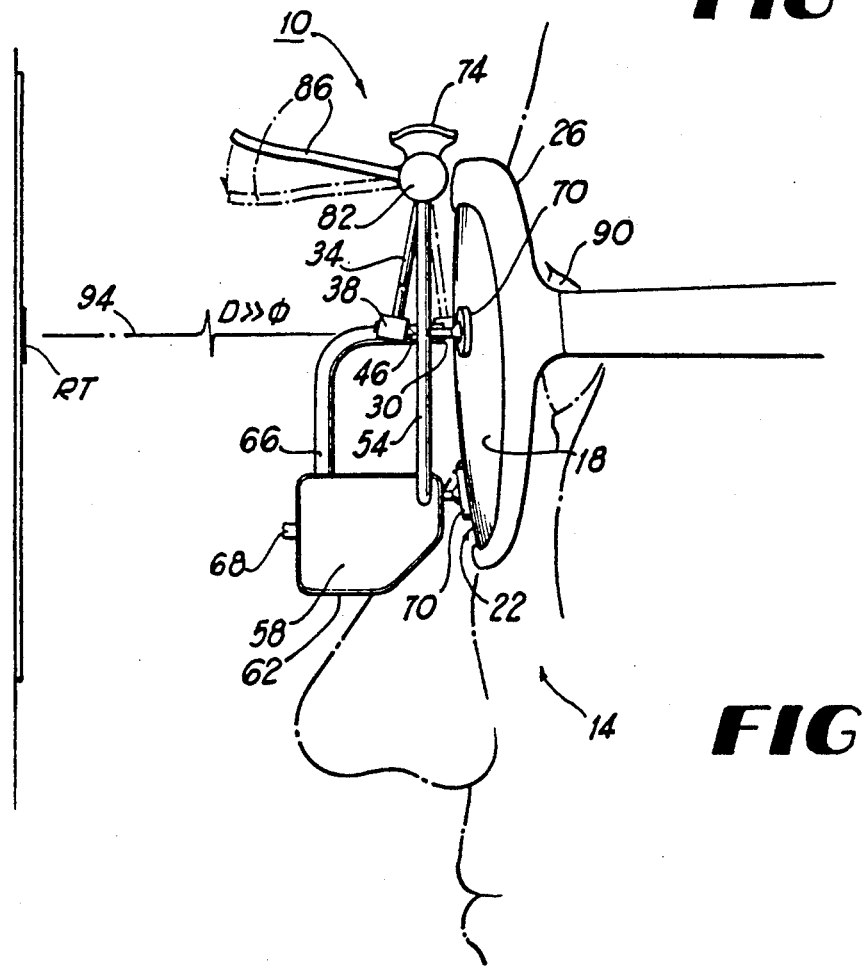
FIG. 2 is a side elevational view of the apparatus of FIG. 1.

FIGS. 1-2 detail an embodiment of the apparatus 10 of the present invention designed to allow subjective determination of the proper positioning of progressive power or other corrective lenses. As shown in FIGS. 1-2, apparatus 10 may be positioned by patient 14 against or immediately adjacent the exterior surface 18 of a lens 22 contained within spectacles 26. New spectacles 26 frequently include a plane simulator lens which may serve as lens 22, although apparatus 10 may be used in connection with the patient's existing spectacles 26 if prescriptive or other lenses are in place. Alternatively, as disclosed in U.S. Pat. No. 4,206,549 to Gould, lens 22 may be cut or stamped from a sheet of plastic and fitted into or otherwise secured to spectacles 26.

Apparatus 10 includes a light source 30, a marking rod 34, and two marking elements 38 and 42 associated with the marking rod 34 and positioned so that their respective tips 46 and 50 are equidistant from light source 30. The ability of the patient to mark lens 22 at two points equidistant light source 30 forms a significant feature of the invention, as bisection of a real or imaginary line drawn between the two points provides the reference from which progressive power or other corrective lens may be precisely positioned or fitted.

Also included as part of apparatus 10 are frame 54, compartment 58, thumb rest 62, stem 66, feet 70, finger rests 74 and 78, bar 82, and actuator arm 86. As illustrated in FIGS. 1-2, frame 54 may be molded or otherwise constructed substantially in a "U" shape and made of any suitable material such as plastic or metal. Frame 54 also may be designed so that the distance between prongs corresponds approximately to or is slightly less than the average width of lens 22 in order not to obstruct the vision of patient 14 significantly. Compartment 58 forms the bottom of frame 54 and may be used to house a battery or other power source for light source 30. Compartment 58 also may include a depression or other thumb rest 62 as its lower surface in order to allow patient 14 to stabilize apparatus 10 when positioned in his or her field of view.

Extending upward from compartment 58 and housing light source 30 is a thin stem 66. Light source 30, which typically may be a small fiber optic channel or a light-emitting diode (LED), is used as a target for the patient 14. Consequently, as best shown in FIG. 2, stem 66 extends beyond the plane defined by the prongs of "U"-shaped frame 54 so that light source 30 may be positioned against or closely proximate exterior surface 18 of lens 22. Stem 66 also serves to sheathe the electrical connections (which may be made via switch 68) between light 10 source 30 and the power source in compartment 58 and, like frame 54, is designed to obstruct little of the patient's vision.

Feet 70, as illustrated in FIGS. 1-2, may be utilized to assist stabilization of apparatus 10 while in use. Any non-abrasive material such as felt or Teflon having a sufficient coefficient of friction to prevent undesired movement of apparatus 10 may form the surface of feet 70, which may be attached to either or both of frame 54 and compartment 58 and oriented to fit substantially flush with the exterior surface of lens 22. Also designed to assist patient 14 in stabilizing apparatus 10 are finger rests 74 and 78 associated with bar 82, which bar 82 is connected near each end to the prongs of "U"-shaped frame 54 and forms the upper section of apparatus 10. Patient 14 typically places a forefinger on one of finger rests 74 and 78 to counteract the upward force generated by the presence of his or her thumb on thumb rest 62.

Movement of marking rod 34 and elements 38 and 42 is accomplished using actuating lever or arm 86. In one embodiment of the invention consistent with FIGS. 1-2, included within bar 82 is a torsion spring associated with actuating arm 86. Referring principally to FIG. 2, in its unactuated position arm 86 lies slightly above the horizontal plane including the center of bar 82, while tips 46 and 50 of marking elements 38 and 42 rest a short distance from exterior surface 18 of lens 22. When patient 14 presses on arm 86, however, typically with the middle finger of the hand holding apparatus 10, the torsion spring stresses and marking rod 34 moves in an arcuate path sufficient to allow tips 46 and 50 (which may be inked felt, grease pencil, or other suitable devices) to contact and mark the exterior surface 18 of lens 22. Once pressure on arm 86 is released, the torsion spring relaxes and returns tips 46 and 50 and arm 86 to their resting positions.

Although FIG. 2 shows marking rod 34 as rigidly attached to actuator arm 86 at an angle of approximately 90°, any appropriate angle may exist between these components. Optimal results likely will be achieved, however, if the travel requirements of marking rod 34 are minimized. Similarly, those having ordinary skill in the art will recognize that actuation means including elements other than a torsion spring may be used to assist forward and return movement of marking rod 34. For example, arm 86 may be designed merely to rotate about bar 82, with sufficient friction existing between arm 86 and bar 82 to require some force to be provided by patient 14 to cause marking rod 34 to contact the exterior surface 18 of lens 22. Marking precision, however, probably will be increased if the amount of force required to be supplied by patient 14 is small.

Operation of apparatus 10, discussed principally relative to the left eye 90 of patient 14 and its corresponding visual axis or primary line of sight 94, may be described as follows. Initially, spectacles 26 should be fitted to patient 14. Although apparatus 10 may be used whether or not spectacles 26 are pre-fitted, adjustment of spectacles 26 after one or both of the lenses 22 are marked may result in improper positioning of the progressive power or other corrective lenses.

Once spectacles 26 are comfortably fitted, patient 14 may grasp apparatus 10 with the forefinger of his or her left hand placed on finger rest 74 and thumb placed on thumb rest 62. Patient 14 then, preferably while standing or sitting and with his or her head in its primary position, fixates (using both left and right eyes 90 and 98, respectively) on a remote target RT such as a chart, picture, or other suitable object located along primary line of sight 94. While fixating on the remote object patient 14 positions apparatus 10 so that light source 30 is located immediately adjacent exterior surface 18 of lens 22 and centered along primary line of sight 94. Once light source 30 is centered patient 14 actuates arm 86, typically with his or her left middle finger, and causes marking rod 34 to contact lens 22 at two points along its exterior surface 18. Lens 22 may then be used as a model for creating the progressive power or other corrective lens to be fitted into the corresponding section of spectacles 26.

A similar procedure may be followed in connection with the right eye 98 of patient 14, with the patient 14 typically grasping apparatus 10 in his or her right hand with its forefinger positioned on finger rest 78. Moreover, those having ordinary skill in the art will recognize that apparatus 10 may be modified to allow simultaneous or concurrent marking of lenses 22 associated with both the left and right eyes 90 and 98. Apparatus 10 similarly may be modified so that it clips onto or is otherwise attached to the exterior portion of spectacles 26 if desired. Additional marking elements and tips may be added to, for example, allow triangulation of the reference point for the final corrective lenses. Alternatively, apparatus 10 may be modified so that a single (very thin) marking tip is aligned with the center of light source 30 and thereby is capable of making a single mark corresponding to the exact location of the corrective lens reference point. Light source 30 similarly may be modified so that, for example, it clips to the nasal bridge of spectacles 26 and extends away from patient 14, in which case the patient 14 may view the light source 30 in a distant mirror. In each case, however, apparatus 10 is designed so that a known or determinable relationship exists between the locations marked on lens 22 and the point on lens 22 through which patient 14 aligned light source 30.

Because apparatus 10 is designed to obstruct very little of the vision of patient 14, his or her peripheral vision remains intact and allows binocular fusion to occur, thereby avoiding introduction of accuracy-reducing phoria. Stabilizing apparatus 10, decreasing the amount of force required to move actuating arm 86, and limiting the travel distance of marking rod 34 further improve the accuracy of the resulting measurements by minimizing movement of spectacles 26 relative to apparatus 10 while in use. If the vision of patient 14 is extremely poor when a simulated plane or a non-optimal prescriptive lens is used as lens 22, the remote object on which patient 14 fixates may itself be illuminated or otherwise acted upon to be more easily seen. By minimizing the errors associated with traditional objective positioning devices, apparatus 10 allows the precise location where a power change or other appropriate component of the corrective lens should exist or begin to be obtained merely by bisecting an imaginary or real line drawn to connect the two marks on lens 22 or otherwise determining the relationship between the mark or marks and the point on lens 22 through which patient 14 aligned light source 30.

Figure 3:
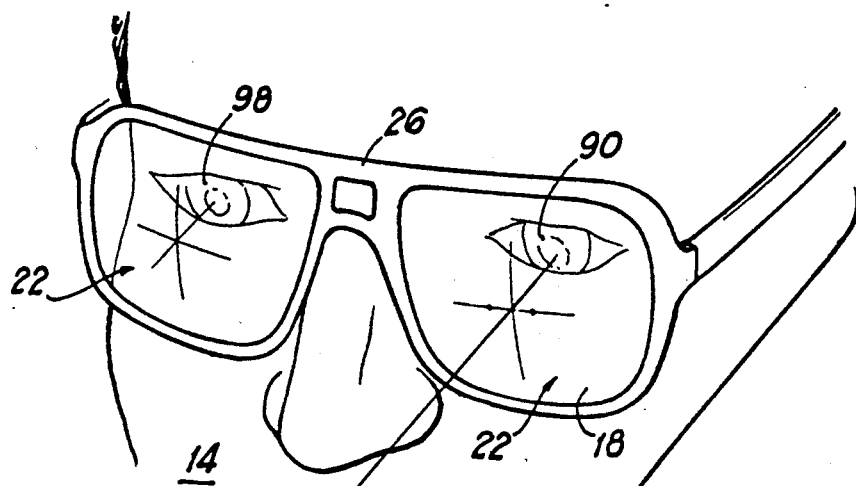
FIG. 3 is a perspective view of a first alternate embodiment of the apparatus of the present invention.

FIGS. 3-6 detail alternate embodiments of the present invention. Each of apparatus 310, 410, 510, and 610 include a light source and associated marking means and function similar to apparatus 10. Apparatus 310 of FIG. 3, for example, comprises a light source 330, frame 354, compartment 358, thumb (or middle) finger) rest 362, stem 366, electrical switch 368, feet 370, (middle) finger (or thumb) rest 374, actuator arm 386, and a torsion spring stressed when arm 386 is actuated, typically using the patient's forefinger. Apparatus 310 also includes two marking elements 338 and 342 and corresponding marking tips 346 and 350. Unlike the marking elements 38 and 42 of apparatus 10, however, marking elements 338 and 342 are connected to a pair of marking rods 334a and 334b, both of which are actuated by arm 386 via a flexible cable or other suitable transmitting device. Moreover, each of feet 370 positioned near the top of the prongs of "U"-shaped frame 354 houses a trunnion about which marking 15 and 334b pivot while guided by tracks 388. Although marking rods 334a and 334b as illustrated in FIG. 3 must travel farther than rod 34 of FIGS. 1-2 to contact the exterior surface 18 of lens 22, their resting positions thereby are a greater distance from the primary line of sight 94 of patient 14.

Figure 4:
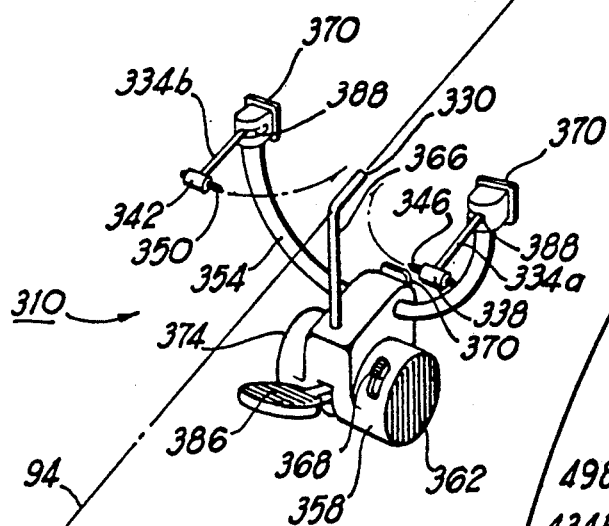
FIG. 4 is a perspective view of a second alternate embodiment of the apparatus of the present invention.
Figure 4:
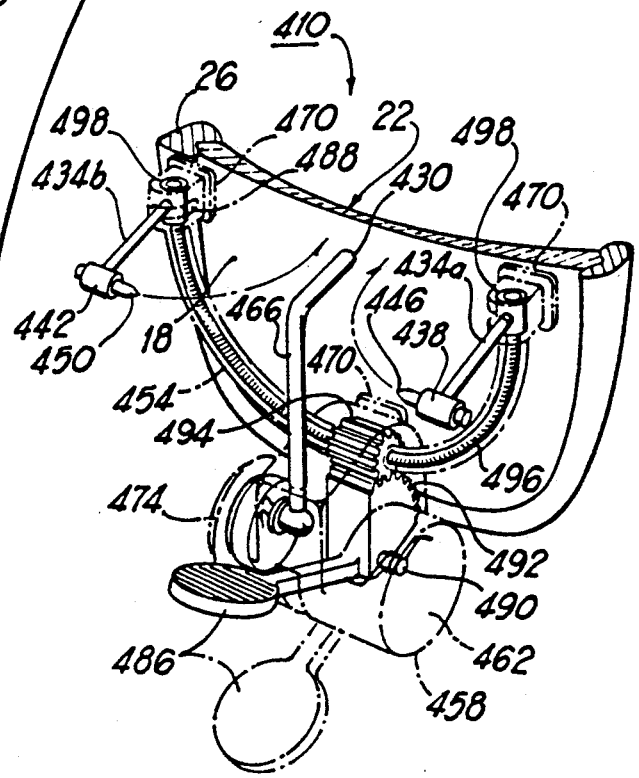

FIG. 4 details another embodiment of the present invention in which the actuating mechanism includes arm 486, torsion spring 490, rack gear 492, pinion gear 494, flexible cable 496, and trunnions 498. Depressing actuator arm 486 stresses torsion spring 490 and causes the teeth of rack gear 492 to engage corresponding teeth of pinion gear 494. Flexible cable 496 associated with pinion gear 494 transmits the movement, thereby causing marking rods 434a and 434b to pivot about trunnions 498 while guided by tracks 488. Apparatus 410 also includes light source 430, marking elements 438 and 442 having tips 446 and 450 respectively, frame 454, compartment 458, thumb (or middle) finger) rest 462, stem 466, momentary switch 468 (which also serves as a (middle) finger (or thumb) rest), and feet 470.

Figures 5, 6:
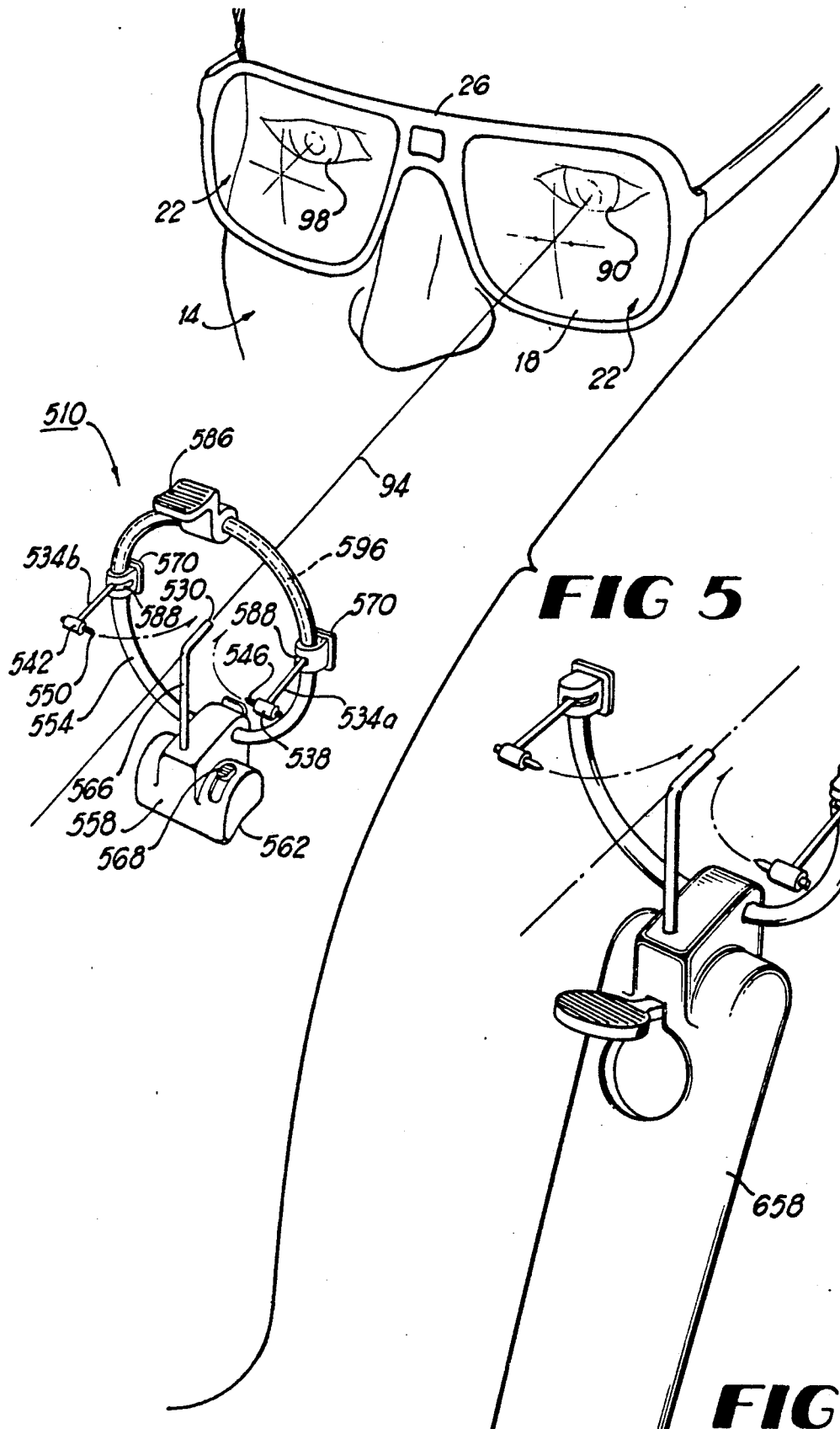
FIG. 5 is a perspective view of a third alternate embodiment of the apparatus of the present invention.
FIG. 6 is a perspective view of a fourth alternate embodiment of the apparatus of the present invention having an attached handle.

FIG. 5 illustrates an alternate embodiment of the present invention having a circular frame 554 and a combined actuator arm and forefinger rest 586. Other components of apparatus 510 shown in FIG. 5 include light source 530, marking rods 534a and 534b, marking elements 538 and 542, marking tips 546 and 550, compartment 558, thumb rest 562, stem 566, switch 568, feet 570, tracks 588, and flexible cable 596. Finally, FIG. 6 details an apparatus 610 nearly identical to apparatus 310 of FIG. 3 to which compartment 658 has been extended to form a handle. To use apparatus 610, patient 14 merely grasps handle or compartment 658 in the palm of his or her hand.

The foregoing is provided for purposes of illustration, explanation, and description of embodiments of the present invention. Various modifications to and adaptations of the embodiments, including those discussed earlier, will be apparent to those of ordinary skill in the art and may be made without departing from the scope or spirit of the invention. Finally, although the apparatus of the present invention shown in FIGS. 16 are designed to be held by patient 14, and allow for precise positioning of corrective lenses when the subjective techniques described above are used, the apparatus may be held by the practitioner or attached to a stationary object if necessary, as when patient 14 lacks full hand or arm function.

I claim:

1. A device capable of being used by a patient having an eye and a visual axis associated with the eye and in connection with spectacles having a lens through which the visual axis may pass, comprising:
   a. a target;
   b. means, positionable adjacent the lens opposite the lens from the eye, for permitting alignment of the target with the visual axis without preventing binocular fusion from occurring; and
   c. means, connected to the aligning means, for marking two points on the lens, each of which points is equidistant from the point on the lens through which the visual axis passes.

2. A device according to claim 1 in which the aligning means comprises a rod connected to the target and is capable of being held by the patient.

3. A device according to claim 2 in which the target comprises a fiber optic light source.

4. A device according to claim 2 in which the target comprises a light emitting diode.

5. A device according to claim 2 in which the aligning means is attachable to the spectacles.

6. A device for permitting a patient having an eye and a visual axis associated with the eye to determine the appropriate position of graded components of a first corrective lens within a pre-fitted spectacle frame having a second lens through which the visual axis may pass, comprising:
   a. an illuminated target alignable by the patient with the visual axis and positionable adjacent the second lens opposite the second lens from the eye so that the target does not prevent binocular fusion from occurring; and
   b. means, associated with the target, for allowing the patient to mark the second lens at two points bearing a determinable relationship to the point on the second lens through which the visual axis passes.

7. A device according to claim 6 in which the allowing means comprises at least one spring-loaded marking rod.

8. A device according to claim 6 in which the allowing means comprises:
   a. an actuator arm in a first position and depressible by the patient to a second position;
   b. a torsion spring stressed by depression of the actuator arm, for causing the actuator arm to return to its first position when no longer depressed;
   c. a rack gear having rack teeth, which rack gear is connected to the actuator arm;
   d. a pinion gear having teeth engaged by the rack teeth;
   e. first and second marking rods; and
   f. means for transmitting movement caused by depression of the actuator arm from the pinion gear to the first and second marking rods.

9. A method for permitting a patient having an eye and a visual axis associated with the eye to assist in determining the appropriate position of a first corrective lens within a spectacle frame having a second lens through which the visual axis may pass, comprising the steps of:
   a. aligning a target with the visual axis a determined by the patient so that the target does not prevent binocular fusion from occurring; and
   b. marking the second lens in at least one location with a marking means associated with the target.

10. A method according to claim 9 in which the aligning step further comprises the step of positioning the target adjacent the second lens opposite the second lens from the eye.

11. A method according to claim 10 further comprising the step of causing the patient to focus on a distant object while maintaining the patient's head in its primary position.

12. A method according to claim 11 further comprising the step of repeating steps (a) and (b) for the second lens and visual axis associated with the other eye of the patient.

13. A device for marking a lens worn by a patient having a visual axis, comprising:
    a. a frame for positioning the device adjacent the lens;
    b. a light source connected to the frame and alignable with the visual axis; and
    c. a first marker connected to the frame for marking the lens.

14. A device according to claim 13 further comprising a second marker connected to the frame equidistant the light source from the first marker.

15. A device according to claim 14 in which the frame comprises means for being held by the patient while the device is in use.

16. A device according to claim 13 further comprising means for actuating the first marker in order to mark the lens.

17. A device according to claim 14 further comprising means for actuating the second marker in order to mark the lens.

18. A device according to claim 14 further comprising means for concurrently actuating the first and second markers in order to mark the lens.

* * * * *